April 24, 1945.　　D. C. PFEIFFER ET AL　　2,374,232
DESICCATING APPARATUS
Original Filed Nov. 2, 1939
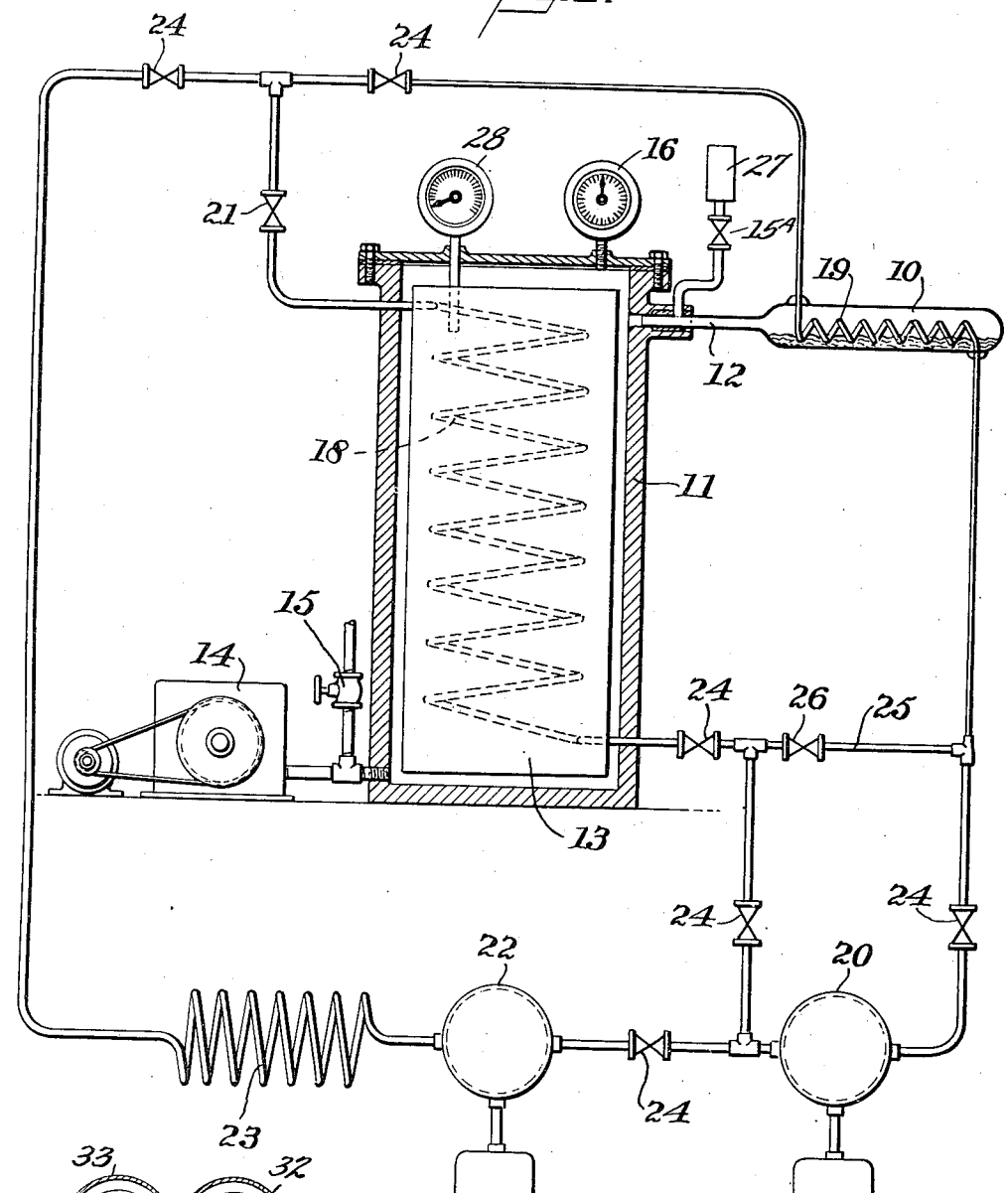
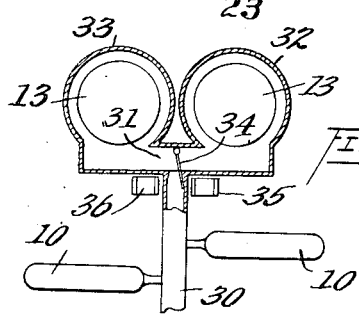
Inventors:
David C. Pfeiffer,
Joseph MacGlashan Hill,
By Cushman Darby Cushman
Attorneys.

Patented Apr. 24, 1945

2,374,232

UNITED STATES PATENT OFFICE 2,374,232

DESICCATING APPARATUS

David Clifford Pfeiffer and Joseph MacGlashan Hill, Dallas, Tex.

Original application November 2, 1939, Serial No. 302,598. Divided and this application November 12, 1941, Serial No. 418,786

2 Claims. (Cl. 34—80)

This invention relates to a drying apparatus and more particularly to a device adapted to drying biological products, such as serums, vaccines, toxins, antitoxins, and foods such as eggs, milk, fruit juices, and any food which is preservable by the removal of water.

In the past, it has been proposed to dry serums by this process and a frozen body of serum may be thus dried by subliming the ice. In the prior art, machines have been constructed which successfully dried biological materials in small amounts and to a certain extent have been used commerically in laboratory installations. However, due to high operating costs, their commercial use has been restricted to machines of limited capacity useful for drying such materials only.

These machines have operated upon the principle above stated of subjecting a frozen solution of the substance to be dried to a high vacuum to cause the ice contained in the specimen to sublime. The water vapor thus produced has been removed by various expedients such as condensing it in suitable means at extremely low temperatures or in other devices by a chemical union with a suitable reagent.

The present invention in an improvement over all known prior art structures which renders the drying of serums much more efficient. It is the particular object of this invention to provide a machine that may be adapted to the commercial drying of serums, egg whites, milks and similar substances.

It is another object of this invention to provide a vacuum producing means including an adsorption medium to accomplish an unusually high vacuum.

Another object of this invention is to provide means to cool the adsorbing means to render it operative at relatively high vacuums.

Another object of this invention is to provide means to heat the frozen solution being dried to aid in subliming the ice.

Another object of the invention is to incorporate a refrigerating cycle in the drying apparatus whereby the heat dissipated by the condenser of the refrigerating cycle is used to sublime the ice and the liquefied refrigerant is used to cool the adsorption medium.

An additional object is to provide a heat conduction system between an adsorption medium and a solution being dried to minimize the heat requirements of the drying process.

Other objects will appear from the specification.

Figure 1 is a diagrammatic sketch of the apparatus employed in performing the invention herein disclosed, and Figure 2 is a diagrammatic showing of a modification of the apparatus disclosed in Figure 1.

According to the teaching of this invention, a solution to be dried is subjected to a vacuum to cause the water to evaporate. The word solution as used in this specification, includes all substances wherein water and other molecular structures are combined to form a substance in which the molecules of water retain their characteristic identity, e. g., true solutions, a colloidal solution, emulsions, gels, etc.

In one manner of using the invention, the solution may first be subjected to a reduced pressure to remove all gases entrained therein with a gentle action. After the degassing step has been performed, the pressure is further reduced to cause a rapid evaporation of water which results in a cooling of the solution. This cooling process is continued while the solution is maintained in a quiescent state until it is supercooled and therefore, the moment ice crystals begin to form, the whole solution is instantaneously converted to a frozen phase. This instantaneous freezing may be advantageous for certain substances. The solution need not be necessarily frozen by this method and it is also to be understood that certain solutions need not be instantaneously solidified.

The frozen solution is then dried, while in this state, by subjecting it to a relatively high vacuum. The vacuum attained by the apparatus hereinafter described is below 4.58 mm. or that pressure at which water freezes and in general should be as low as may be economically produced. Pressures of between .015 mm. and .50 mm. have been used and the lower the pressure the more rapid the evaporation. This relatively low pressure is effective to cause the ice to sublime and the high vacuum is continued until substantially all the ice has been converted into water vapor and has been removed from the solution.

The solution as thus dried is capable of being stored indefinitely if sealed from air containing moisture, yet may be restored at any time to its original characteristics merely by the addition of a suitable quantity of water with which it readily recombines.

Referring to the diagrammatic sketch of the apparatus, the solution is placed in a container 10 which has open communication with a chamber 11 through a passage 12. The chamber 11 has a body of silica gel 13 or other suitable adsorbing or absorbing means therein and also has any well known type of vacuum pump 14, adapted to provide a vacuum as described above, operatively connected thereto. The definition of the word adsorbent for the purposes of this specification includes all materials for mechanically condensing water vapor to a liquid state either by adsorption or absorption, it being immaterial to the use of this invention which phenomenon is used to reach the desired result. The desiccants herein contemplated, such as silica gel, are generally of the type whose temperature rises due to sorptive activity.

The vacuum pump removes all non-condensible gases which may leak into the system and is also effective when required, to create the low pressure condition in the system which causes all the gas entrained in the solution to be slowly extracted. The pump may further be useful in initially providing a sufficiently low vacuum by removing substantially all the non-condensible gases such that the water in evaporating from the solution will cool it to the freezing point. When the pressure has been reduced to this stage, the water vapor flowing from the solution into the chamber 11 will be condensed by the adsorption medium so that the pressure may be held at this point until the freezing process is complete.

The intake of the vacuum pump may be provided with a bleed valve 15 to permit an accurate control of the pressure within the chamber. This is the most efficient location to conserve the capacity of the adsorbent. However, when material being processed must be kept sterile, a bleed valve 15A must be so located that any flow of air is away from the sterile area. This is accomplished by placing the valve anywhere on the entire part of the system which is sterilized such as at the connection between passage 12 and chamber 11. The air entering the bleed valve must be sterile. This sterilization may be accomplished by any suitable means such as passing through a Seitz filter 27.

The pressure in the chamber is indicated on a vacuum gage 16 and is varied in the proper sequence to obtain the degassing and freezing steps above outlined. A suitable thermometer 28 may be provided to indicate the temperature of the adsorbent medium. When the solution has been completely frozen, the bleed valve 15 or 15A is shut off and the extremely low absolute pressure referred to is established whereby the frozen solution is dried by subliming the ice at this high vacuum.

In the process of subliming the ice in the solution, heat energy is required and conversely when the water vapor flows from the container 10 and is condensed by the adsorption medium, heat energy is liberated. In small installations, the heat required to vaporize the ice may be supplied from the surrounding atmosphere and the vapor is removed at such a rate that the solution remains at a temperature below its freezing point. In large machines, such as are required in the drying of certain solutions in large quantities, due to the bulk of the frozen solution, heat may be positively supplied in the appropriate amount to sublime the ice. The adsorption medium, on the other hand, is heated so materially by the condensing water vapor, so that in order to render the apparatus operative at these pressures, the adsorption medium must be cooled.

The following example will demonstrate the necessity of cooling the adsorption medium. In the case of silica gel at 10 mm. mercury absolute pressure and with the silica gel at a temperature of 50° F., it may be saturated up to approximately 36% of the weight of the dry gel.

If the silica gel has a temperature of 100° F., at 0.3 mm. mercury absolute pressure, it may be saturated only to about 5%. At this same pressure and a temperature of 50° F., it may be saturated only to approximately 8% of its dry weight, but if kept at 0° F. at 0.3 mm., its possible saturation is 13%. From these determinations, it may be expressed that the ability of silica gel, or any adsorption medium, to remove water vapor is proportional to the pressure and inversely proportional to the temperature.

It is seen how these variable conditions effect the adsorption medium and therefore, if it is to be effective to create the low pressure condition which is essential to the functioning of the present drying method, the latent heat of vaporization liberated at the vapor condensing stage, must be rapidly and positively dissipated.

From the description so far given, the function of the silica gel in producing the low pressure is apparent. The vacuum pump 14 is operative to start the drying process and while it may be continuously driven to remove the non-condensible gases which may get into the system, it is, in itself, inadequate to remove the large volume of vapor produced as the ice sublimes. The low pressures attainable with this apparatus therefore result when the silica gel condenses this vapor rapidly as it is adsorbed therein. The condensation of the vapor, of course, changes its volume and the vacuum pump, by removing the non-condensible gases, thus cooperates with the silica gel to reduce the pressure within the system to the required degree.

In order to cool the adsorption medium, a cooling coil 18 is provided through which a refrigerant or cooling fluid may flow. Where a positive supply of heat is required, as in the larger types of machines, the solution being dried has a heating coil 19 adjacent thereto or passing therethrough so that heat may be applied to the frozen material to cause the ice to sublime. The heat supplied through coil 19 is just sufficient to sublime the ice, and it must be carefully controlled so that too much heat will not flow to the frozen solution and cause it to melt. It is to be understood, of course, that the solution being dried is maintained in a substantially solid or frozen state during the entire water removal process.

The heating coil 19 and cooling coil 18 may be incorporated in a refrigerating cycle and a compressor 20 driven by a suitable motor, is adapted to receive the expanded refrigerant to compress it for delivery to the condenser. The hot compressed gases flow from the compressor to the heating coil 19 which also forms the condenser of the refrigerating system. The refrigerant gases are liquefied by giving off their latent heat at this point and pass from the coil 19 through an expansion valve 21 to the cooling coil 18. The liquid refrigerant flows into the body of the adsorption medium through this coil which may be considered the evaporator of the refrigeration cycle, and is evaporated by the heat generated upon the condensation of the water vapor on the surface of the adsorption medium.

In order that the heat supplied to the frozen solution will not be so great as to cause any detrimental melting thereof, a portion of the compressed refrigerant gas is by-passed around heating coil 19 and in the embodiment of the invention herein shown, a booster compressor 22 receives a portion of the expanded refrigerant, compresses it and delivers it to a condenser 23 which dissipates heat from the hot compressed gases in such a manner that the frozen solution is not heated thereby. The liquid refrigerant flowing from the condenser 23 is delivered by suitable piping into the inlet end of the cooling coil 18 through expansion valve 21.

Suitable control valves 24 are disposed throughout the piping system of the refrigerating mechanism in such a manner that the flow of the refrigerant may be apportioned between the heating coil 19 and condenser 23 to obtain the required heat in the solution. A pipe 25 may be provided around the compressor 20 and a valve 26, normally closed, is associated therewith so that if it is desired to establish an equilibrium condition between the frozen solution and the silica gel, the same piping system may be used.

The by-pass in the refrigerant circuit is required due to the excess of heat available at the condenser of a refrigerating cycle as compared with the heat which may be absorbed at the evaporator. While it is also true that more heat may be required to sublime the ice than is given out when the vapor is condensed, it has been found that even considering a perfect cycle, the heat of compression added to the gas is more than enough to supply the additional heat required to vaporize the ice. It is this difference between the heat given off at the condenser and the heat required to vaporize the ice that necessitates circulating a portion of the refrigerant gas through the booster system, in order to obtain an adequate supply of liquid refrigerant to cool the adsorption medium.

The refrigerating system above described is the preferred method of heat transfer between the adsorption medium and the solution being dried, due to the ease with which the energy transfer may be controlled. However, it is within the concept of this invention that other means may be used.

As indicated above in the use of this apparatus, a solution to be dried is placed in container 10 which is then connected to the chamber 11. When all of the openings to the chamber have been closed, the vacuum pump 14 is started and a reduced pressure is developed in the chamber 11 so that if necessary, the solution may be degassed without a violent boiling action and thereafter the pressure is further reduced whereby the evaporation of water from the solution will cause it to be substantially instantaneously frozen. When the degassing has been completed, the bleed valve 15 or 15A is closed and the vacuum pump is operated to provide a vacuum with as low an absolute pressure as is economically required. In laboratory models, degassing and freezing is usually completed by the time a pressure of 1.5 mm. is attained, and this may be reduced further to as low as .015 or lower for the completion of the process. This vacuum is continuously maintained so that the ice in the solution will evaporate or sublime and water vapor will be drawn into chamber 11. The water vapor flowing into the chamber is readily condensed by the cooled adsorption medium, so that its volume is immediately reduced and the vacuum is not destroyed.

In performing the degassing and freezing steps in the apparatus disclosed, in certain instances, it has been found that a substantial portion of the water may be removed from the solution. As the solution will freeze so long as the vapor pressure within the apparatus is maintained below 4.5 mm. of mercury, a smaller total quantity of adsorbent will be required to dry a given quantity of a solution if the removal of the water is accomplished by two or more stages of drying. It will be appreciated that if a single drying stage is used, the adsorbent material must be maintained at a relatively low absolute system pressure to dry material to the degree required by this process. It has been suggested above that the pressure should be as low as possible and assuming that a final vapor pressure of the gaseous medium surrounding the adsorbent of 0.3 mm. and a temperature of 50° F. is attained, the medium, if silica gel, will hold approximately 8% moisture figured on its dry weight. When the drying process is performed in two stages, a substantial portion of the water may be removed while the solution is being frozen. In this circumstance, the vapor pressure of the gaseous medium surrounding the adsorbent need not be as low as 0.3 mm. and if it is maintained at 2.0 mm., the adsorption ability of the silica gel is increased about 6½% or it will hold about 14½% moisture. After the solution has been frozen, the pressure may then be reduced to the lower limit required and the second stage of drying is run.

A modification of the machine shown in Figure 1 and adapted to perform a two stage drying process is shown in Figure 2. One or more containers 10 may be connected to a manifold 30 in any well known manner, the manifold having communication through conduit 31 with the two chambers 32 and 33 each of which contains a body of silica gel 13. A flap valve 34 is provided in conduit 31 to direct the water vapor flowing from the manifold into either chamber and it may for instance direct the vapor into chamber 32 until the degassing and freezing steps have been performed and then the valve may be changed to direct the flow into chamber 33.

The valve may be made of a magnetic material and operated by electro-magnets 35 and 36. With this construction, the valve may be pivotally mounted on the inner side of the conduit 31 and moved from one position to the other from the outside without the necessity of any operating parts extending through the manifold or conduit wall thus minimizing possible leakage.

It is to be understood, of course, that the heat transfer cycle between the adsorption medium and the solution being dried as described in connection with the apparatus shown in Figure 1 is to be used to control the process as practiced in using the modification of the apparatus shown in Figure 2.

By practicing a multiple stage drying method as thus outlined, it is seen that the first stage of drying may be performed under conditions which permit the adsorption medium to hold a larger percentage of moisture and therefore, requires a smaller quantity of material to remove a given quantity of water. The second stage, of course, follows the practice already described and therefore, the total quantity of adsorbent medium required in the individual stages is less than is required in a single stage.

The apparatus herein described is particularly adapted for drying of biological products and foods which may be preserved by the removal of water and in general results in a crystalline flaky substance that may be readily grounded to a powder and which may be stored indefinitely as long as it is preserved free from water. The preserved substance may be restored to its original form merely by adding water, and, due to the structural characteristics of the dried material, the water is readily reincorporated in the solution with the material.

Egg whites and milks are dried to a white residue having a porous spongy structure that crumbles into flakes as they are removed from the containers in which they are dried and permits the residue to be readily re-dissolved in water due to the unusually large surface available in the mass. Unlike desiccation from the liquid state at higher temperatures, proteins and protein-like substances are practically unaltered in composition. As a result of this retention of the original chemical and physical composition of proteins, high solubility is retained. Furthermore the original taste and biological characteristics of the substance are retained so that when they are revived by the addition of water, their action and whole appearance is exactly like a fresh sample. In the case of egg whites and milks, the taste characteristics are not changed and the egg whites may be beaten to a stiff white mass as is required in many cooking recipes. Substances dried as above described are not sterilized by the process. However, bacteria originally present are dormant, and such dried material, due to lack of water, will not support growth of bacteria either originally present or added.

The apparatus above described may be adapted to the drying of many substances and the description of its use given above is, therefore, not intended to be a limitation but is presented merely to show several ways in which it may be of practical use.

This application is a division of our copending application Serial No. 302,598, filed November 2, 1939.

The invention is particularly described in the following claims.

We claim:

1. Dehydrating apparatus comprising a chamber for the material to be dehydrated, means in connection with said chamber for creating a vacuum condition in the chamber, a desiccant of a type whose temperature rises due to its sorptive activity arranged to collect vapors liberated by the material as a result of said vacuum condition, a refrigerating circuit including a condenser and an evaporator respectively arranged in heat transferring relation to the material and to the desiccant, a second refrigerating circuit which includes said evaporator but which by-passes said condenser, and means for apportioning the evaporator output between said circuits whereby to control the heat delivery of said condenser.

2. Dehydrating apparatus comprising a chamber for the material to be dehydrated, means in connection with said chamber for creating a vacuum condition in the chamber, a desiccant of a type whose temperature rises due to its sorptive activity arranged to collect vapors liberated by the material as a result of said vacuum condition, a refrigerating system comprising evaporating means arranged in heat-transferring relation to the desiccant, compressor means in connection with the outlet end of said evaporating means, a pair of conduits connecting said compressor means with the inlet end of said evaporating means, condensers in said conduits respectively, one of said condensers being in heat-transferring relation to the said material, and means for controlling the input to said conduits.

DAVID CLIFFORD PFEIFFER.
JOSEPH MacGLASHAN HILL.